(12) United States Patent
Wakao et al.

(10) Patent No.: US 11,597,833 B2
(45) Date of Patent: Mar. 7, 2023

(54) THERMOPLASTIC RESIN COMPOSITION FOR LASER WELDING, MOLDED ARTICLE MADE OF SAME, AND COMPOSITE MOLDED ARTICLE

(71) Applicant: Toray Resin Company, Shelbyville, IN (US)

(72) Inventors: So Wakao, Shelbyville, IN (US); Kazuki Akiba, Shelbyville, IN (US)

(73) Assignee: TORAY RESIN COMPANY, Shelbyville, IN (US)

( * ) Notice: Subject to any disclaimer, the term of this patent is extended or adjusted under 35 U.S.C. 154(b) by 384 days.

(21) Appl. No.: 16/994,374

(22) Filed: Aug. 14, 2020

(65) Prior Publication Data

US 2022/0049086 A1   Feb. 17, 2022

(51) Int. Cl.
| | | |
|---|---|---|
| C08L 67/02 | (2006.01) | |
| C08L 63/04 | (2006.01) | |
| C08L 69/00 | (2006.01) | |
| C08K 5/521 | (2006.01) | |
| C08K 7/14 | (2006.01) | |
| C08K 5/29 | (2006.01) | |
| B33Y 40/20 | (2020.01) | |
| B33Y 70/00 | (2020.01) | |
| B33Y 80/00 | (2015.01) | |

(52) U.S. Cl.
CPC ............ *C08L 67/02* (2013.01); *C08K 5/29* (2013.01); *C08K 5/521* (2013.01); *C08K 7/14* (2013.01); *C08L 63/04* (2013.01); *C08L 69/005* (2013.01); *B33Y 40/20* (2020.01); *B33Y 70/00* (2014.12); *B33Y 80/00* (2014.12)

(58) Field of Classification Search
None
See application file for complete search history.

(56) References Cited

U.S. PATENT DOCUMENTS

2010/0266857 A1\* 10/2010 Sakata .................. C08L 67/02
264/255

FOREIGN PATENT DOCUMENTS

JP        2007186584      \*   7/2007

OTHER PUBLICATIONS

Machine translation of Motonori et al JP 2007186584 (Year: 2007).\*

\* cited by examiner

*Primary Examiner* — Robert T Butcher
(74) *Attorney, Agent, or Firm* — Birch, Stewart, Kolasch & Birch, LLP (57) ABSTRACT

Provided is a thermoplastic resin composition suitable for laser welding which has a laser transparency, a good laser weldability, mechanical properties, a high hydrolysis resistance, a laser-welded composite molded article such as a composite article obtained by laser-welding molded resin parts, and a method of laser welding such molded resin articles. The thermoplastic resin composition contains (A) polybutylene terephthalate, (B) polycarbonate, (C) reinforcing fiber, (D) epoxy compound, (E) carbodiimide compound, and (F) phosphorus-based stabilizer.

7 Claims, 3 Drawing Sheets

THERMOPLASTIC RESIN COMPOSITION FOR LASER WELDING, MOLDED ARTICLE MADE OF SAME, AND COMPOSITE MOLDED ARTICLE

FIELD OF THE INVENTION

The present invention relates to a thermoplastic resin composition for laser welding. For example, a thermoplastic resin composition has good properties for laser welding such as laser transparency and laser welding property, mechanical properties, and high hydrolysis resistance. Further, the present invention relates to a laser-welded composite molded article which is obtained by laser welding the molded article(s) formed on the thermoplastic resin composition to another resin molded article.

TECHNICAL BACKGROUND

Thermoplastic polyester resins are used in a wide range of fields such as machine mechanism parts, electric/electronic parts and automobile parts as injection molded products by taking advantage of various properties such as excellent injection moldability and mechanical properties.

However, thermoplastic polyester resins are prone to deterioration due to hydrolysis. When used in engine parts or engine peripheral parts that are exposed to high-temperature and high-humidity environments, in addition to the balance of chemical and physical properties, long-term hydrolysis resistance is also an important property.

Although the injection-molded product can be efficiently produced from the resins, its shape is limited in terms of its flow characteristics and mold structure/design or its complicated shape, and it tends to be difficult to mold articles having complicated shapes. For this reason, conventionally, in order to produce products having the complicated shapes, a plurality of parts are connected or joined by an adhesive, a bolt or the like.

However, sufficient adhesive strength is a problem with adhesives, and cost, labor and weight increase are problems with mechanical joining such as bolts. On the other hand, external heat welding such as laser welding and hot plate welding, friction heat welding such as vibration welding and ultrasonic welding can joint or connect parts in a short time. Because no adhesives or metal parts are used, problems such as the cost and weight increase and environmental pollution do not occur in the laser welding method, and such processes are used more and more.

Laser welding, which is one of the external heat welding methods, is a method of irradiating a laser beam on laminated or overlapped resin molded articles, allowing laser to pass through one of the irradiated resin bodies and to be absorbed to the other body, whereby melting and fusing connect these articles. Since it is a non-contact processing and has advantages such as no burr generation, this method is being used a wide range of fields.

Polybutylene terephthalate resins are widely used for various purposes. The polybutylene terephthalate resin has a very low laser beam transmittance as compared with other thermoplastic resins such as a nylon resin. When a polybutylene terephthalate resin is used as a molded product on the laser beam transmitting side and the laser welding method is applied, since the laser beam transmittance is low, so the thickness of the product is severely limited. In order to improve the laser beam transmittance thereof, it is necessary to reduce the thickness of the resin article, which limits the design of the product. Therefore, there is a demand for a polybutylene terephthalate resin having a higher laser beam transmittance.

In order to resolve such problems, previous techniques/resins have shown some improvements. For example, WO 2003/002663 describes improvement of hydrolysis resistance by blending two kinds of epoxy compounds in a polyester composition. However, even with the technique described in WO 2003/002663, the hydrolysis resistance is still insufficient and the laser beam transparency is also insufficient. As another example, WO 2008/001790 proposes a resin composition for laser welding comprising a polybutylene terephthalate resin, a polycarbonate resin, and a polyfunctional compound having three or more functional groups. However, the technique described in WO 2008/001790 also has insufficient hydrolysis resistance.

SUMMARY OF INVENTION

An objective of the present invention is to provide a thermoplastic resin composition for laser welding which has not only laser transparency, laser weldability and mechanical properties but also high hydrolysis resistance, and a laser-welded composite molded article such as a composite article obtained by laser-welding a plurality of molded resin parts.

In view of the above situation, the present inventors have discovered, after extensive studies, that by adding a (C) reinforcing fiber, an (D) epoxy compound, a (E) carbodiimide compound and a (F) phosphorus-based stabilizer to the (A) polybutylene terephthalate and (B) polycarbonate, a thermoplastic resin composition for laser welding, which has not only laser transparency, laser weldability and mechanical properties, but also high hydrolysis resistance, can be obtained, and then arrived at the present invention such as a resin composition and a combined resin article formed by laser welding molded article(s) of the resin composition to the other molded article. For instance, the present application includes at least the following inventions.

1. A thermoplastic resin composition suitable for laser welding comprising:
    55 to 75 parts by weight of a polybutylene terephthalate (A) and 25 to 45 parts by weight of a polycarbonate (B) in total amount of 100 parts by weight;
    25 to 65 parts by weight of a reinforcing fiber (C) based on 100 parts by weight of the polybutylene terephthalate (A) and the polycarbonate (B);
    0.2 to 0.8 parts by weight of an epoxy compound (D) based on 100 parts by weight of the polybutylene terephthalate (A) and the polycarbonate (B);
    0.2 to 0.8 parts by weight of a carbodiimide compound (E) based on 100 parts by weight of the polybutylene terephthalate (A) and the polycarbonate (B), and
    a phosphorus-based stabilizer (F).
2. The thermoplastic resin composition according to above invention 1, wherein the phosphorus-based stabilizer (F) comprises a phosphate compound.
3. The thermoplastic resin composition according to above inventions, wherein an amount of the phosphorus-based stabilizer (F) is 0.01 to 00.8 parts by weight based on 100 parts by weight of the polybutylene terephthalate (A) and the polycarbonate (B).
4. The thermoplastic resin composition according to above inventions, wherein the epoxy compound (D) is a dicyclopentadiene novolac epoxy resin represented by the following general formula (1):

where n is in a range of 0 to 10.

5. A molded article suitable for laser welding comprising the thermoplastic resin composition of the above inventions.

6. A composite molded product obtained by laser welding the molded article according to above invention 5.

7. A method for obtaining a composite molded product comprising:
   providing a molded article comprising the thermoplastic resin composition of above invention 1 and another molded article comprising a thermoplastic resin;
   bringing the molded article and said another molded article into contact each other;
   irradiating a laser beam on the molded article to allow the laser beam to pass through the molded article and to be absorbed to said another molded article, whereby melting and fusing the molded article and said another molded article so as to connect the molded article and said another molded article each other at a portion where the molded article and said another molded article are contacted.

According to the present invention, it is possible to provide a thermoplastic resin composition for laser welding which has not only laser transparency, laser weldability and mechanical properties but also high hydrolysis resistance, and a laser welded composite molded article.

REFERENCES IN THE DRAWINGS

1. Sprue
2. Runner
3. Gate
4. Laser beam transmittance evaluation test piece
7. Laser welding specimen (laser beam transmitting side)
8. Laser welding specimen (laser beam absorbing side)
9. Laser welding track
10 Laser beam radiation device
11 Laser beam

DETAILED DESCRIPTION OF THE INVENTION

The polybutylene terephthalate resin (A) is a polymer obtained by an ordinary polymerization method such as polycondensation reaction of terephthalic acid or its ester-forming derivative and 1,4-butanediol or its ester-forming derivative as main components. Other copolymer components may be added in the polybutylene terephthalate resin (A) in an amount that does not impair the characteristics of the polybutylene terephthalate resin (A), for example, about 20 parts by weight or less. Examples of the other copolymer components employable in the present invention contain an aromatic dicarboxylic acid such as isophthalic acid, phthalic acid, 2,6-naphthalenedicarboxylic acid, 1,5-naphthalenedicarboxylic acid, bis(p-carboxyphenyl) methane, anthracene dicarboxylic acid, 4,4'-diphenyl ether dicarboxylic acid, 5-tetrabutylphosphonium isophthalate acid, 5-sodium sulfoisophthalic acid, and diphenic acid; an aliphatic dicarboxylic acid such as oxalic acid, succinic acid, adipic acid, sebacic acid, azelaic acid, dodecanedioic acid, malonic acid, glutaric acid, and dimer acid; and alicyclic dicarboxylic acids such as 1,3-cyclohexanedicarboxylic acid and 1,4-cyclohexanedicarboxylic acid, and ester-forming derivatives thereof. Further, examples of the other copolymer components contain aliphatic glycols having 2 to 20 carbon atoms such as ethylene glycol, propylene glycol, neopentyl glycol, 1,5-pentanediol, 1,6-hexanediol, decamethylene glycol, and dimer diol; aliphatic diol such as long-chain glycols having a molecular weight of 200 to 100,000 (e.g., polyethylene glycol, poly-1,3-propylene glycol, and polytetramethylene glycol); alicyclic diols such as cyclohexanedimethanol and cyclohexanediol; and aromatic diols such as 4,4'-dihydroxybiphenyl, hydroquinone, t-butylhydroquinone, bisphenol A 2, bisphenol S 2, bisphenol F 2, bisphenol-C and ester-forming derivatives thereof.

For example, preferred examples of polybutylene terephthalate (A) are polybutylene terephthalate, polybutylene (terephthalate/isophthalate), polybutylene (terephthalate/adipate), polybutylene (terephthalate/sebacate), polybutylene (terephthalate/decanedicarboxylate), polybutylene (terephthalate/naphthalate), poly(butylene/ethylene) terephthalate and the like. Here, "/" indicates a copolymer. Two or more kinds of these material may be used in combination.

The polybutylene terephthalate (A) used in the present invention preferably has an intrinsic viscosity in the range of 0.60 to 1.60 dl/g when it is measured in an o-chlorophenol solution at 25° C. When the intrinsic viscosity is 0.60 dl/g or more, it is possible to obtain a molded product that is excellent in mechanical properties such as tensile strength, bending strength, bending elastic modulus, and impact resistance. It is more preferably that the range is 0.80 dl/g or more for the intrinsic viscosity. On the other hand, when the intrinsic viscosity is 1.60 dl/g or less, the fluidity can be further improved.

The method for producing the polybutylene terephthalate (A) used in this invention is not especially limited, and a publicly known polycondensation method, ring opening polymerization method or the like can be used for the production. Either batch polymerization or continuous polymerization can be employed, and either an ester interchange reaction or a direct polymerization reaction can be applied. However, for such reasons that the concentration of carboxyl terminal groups can be kept small and that the flowability can be effectively enhanced, a continuous polymerization is preferred, and a direct polymerization is preferred in view of cost.

Incidentally, it is preferable to add a catalyst to the esterification reaction or transesterification reaction and polycondensation reaction. Specific examples of the catalyst include organic titanium compounds, tin compounds, zirconia compounds and antimony compounds. Examples of the organic titanium compound include ester of titanic acid such as methyl ester, tetra-n-propyl ester, tetra-n-butyl ester, tetraisopropyl ester, tetraisobutyl ester, tetra-tert-butyl ester, cyclohexyl ester, phenyl ester, benzyl esters, tolyl esters, and mixed esters thereof. Examples of the tin compound include dibutyl tin oxide, methylphenyl tin oxide, tetraethyl tin, hexaethylditin oxide, cyclohexahexyldi tin oxide, didodecyl tin oxide, triethyl tin hydroxide, triphenyl tin hydroxide, triisobutyl tin. Included are acetate, dibutyltin diacetate, diphenyltin dilaurate, monobutyltin trichloride, dibutyltin dichloride, tributyltin chloride, dibutyltin sulfide and butylhydroxytin oxide, and alkylstannonic acid such as methylstannonic acid, ethylstannonic acid, butylstannonic acid. Examples of the zirconia compound include zirconium tetra-n-butoxide and the like. Examples of the antimony compound include antimony trioxide and antimony acetate. These compounds may be used in combination. Among these, organic titanium compounds and tin compounds are preferable. Tetra-n-propyl ester, tetra-n-butyl ester and tetraisopropyl ester of titanic acid are more preferable, and tetra-n-butyl ester of titanic acid is particularly preferable. From the viewpoint of mechanical properties, moldability, and color tone of the obtained resin composition, the amount of the catalyst added is preferably in the range of 0.005 to 0.5 parts by weight, and more preferably 0.01 to 0.2 parts by weight, based on 100 parts by weight of the polybutylene terephthalate resin.

The amount of polybutylene terephthalate (A) in the thermoplastic resin composition of the present invention is in the range of 55 to 75 parts by weight based on 100 parts by weight of the polybutylene terephthalate (A) and the polycarbonate (B) in total. When the blending amount of the polybutylene terephthalate (A) is 55 parts by weight or more, the fluidity and hydrolysis resistance of the thermoplastic resin composition are enhanced. The amount of the polybutylene terephthalate (A) is preferably 55 parts by weight or more, more preferably 60 parts by weight or more. On the other hand, when the blending amount of polybutylene terephthalate (A) is 75 parts by weight or less, the laser beam transmittance of the molded product is enhanced. The amount of the polybutylene terephthalate (A) is preferably 75 parts by weight or less, and more preferably 70 parts by weight or less, based on 100 parts by weight of the polybutylene terephthalate (A) and the polycarbonate (B).

The polybutylene terephthalate resin (A) is a polymer obtained by an ordinary polymerization method such as polycondensation reaction of terephthalic acid or its ester-forming derivative and 1,4-butanediol or its ester-forming derivative as main components. Other copolymer components may be added in the polybutylene terephthalate resin (A) in an amount that does not impair the characteristics of the polybutylene terephthalate resin (A), for example, about 20 parts by weight or less. Preferred examples of these polymers and copolymers are polybutylene terephthalate, polybutylene (terephthalate/isophthalate), polybutylene (terephthalate/adipate), polybutylene (terephthalate/sebacate), polybutylene (terephthalate/decanedicarboxylate), polybutylene, (terephthalate/naphthalate), poly(butylene/ethylene) terephthalate and the like. These copolymer components may be used alone or in combination of two or more kinds.

Polycarbonate (B) is a polymer obtained by, for example, reacting a raw material containing a dihydric phenol and a carbonate precursor such as phosgene or a carbonate compound as a main component. For example, the polymer is produced by a reaction between a dihydric phenol and a carbonate precursor such as phosgene in a solvent such as methylene chloride, or by a transesterification reaction between the dihydric phenol and a carbonate precursor such as diphenyl carbonate.

Examples of the dihydric phenol include 2,2-bis(4-hydroxyphenyl)propane [bisphenol A] 2, bis(4-hydroxyphenyl)alkane, 1,1-(4-hydroxyphenyl)methane, 1,1-(4-hydroxyphenyl)ethane, hydroquinone, bis(4-hydroxyphenyl) cycloalkane, bis(4-hydroxyphenyl)oxide, bis(4-hydroxyphenyl)sulfide, bis(4-hydroxyphenyl)sulfone, bis(4-hydroxyphenyl) sulfoxide, bis(4-hydroxyphenyl) ether and the like. These may be used alone or in combination of two or more kinds. Among these, 2,2-bis(4-hydroxyphenyl)propane [bisphenol A] is preferable.

Examples of the carbonic acid ester compound include diaryl carbonate such as diphenyl carbonate and dialkyl carbonate such as dimethyl carbonate and diethyl carbonate. These may be used alone or in combination of two or more kinds.

The polycarbonate (B) used in the present invention preferably has a number average molecular weight (Mwn) of 10,000-60,000. When the average molecular weight is 10,000 or more, mechanical properties such as tensile strength, bending strength, bending elastic modulus and impact resistance of the molded product are further improved. An average molecular weight of 15,000 or more is more preferable. On the other hand, when the average molecular weight is 60,000 or less, the fluidity of the thermoplastic resin composition is further improved. The average molecular weight of is more preferably 40,000 or less. Polycarbonate having such an average molecular weight is available, for example, from Mitsubishi Engineering Plastics Co., Ltd. under the trade name of "Iupilon" (registered trademark) H3000 (trade name).

The amount of the polycarbonate (B) in the present invention is in the range of 25 to 45 parts by weight based on 100 parts by weight of the above-mentioned polybutylene terephthalate resin (A) and the polycarbonate (B) in total. When the amount of the polycarbonate is 25 parts by weight or more, the laser beam transmittance of the molded product is improved. The amount thereof is preferably 25 parts by weight or more, and more preferably 30 parts by weight or more. On the other hand, when the amount of the (B) polycarbonate compounded 45 parts by weight or less, the fluidity and hydrolysis resistance of the thermoplastic resin composition are improved. The amount thereof is preferably 45 parts by weight or less, and more preferably 40 parts by weight or less based on 100 parts by weight of the polybutylene terephthalate resin (A) and the polycarbonate (B).

As the (C) reinforcement fiber usable in the present invention, it is possible to use glass fiber, carbon fiber, metal fiber and organic fiber (e.g., nylon, polyester, aramid, polyphenylene sulfide, liquid crystal polymer, acrylic polymer). Such reinforcement fibers can also be used alone or in combination. Glass fiber is preferably usable. For example, such a glass fiber can be obtained from Nippon Electric Glass Co., Ltd. under the trade name T-120. The fiber diameter of the reinforcement fiber is preferably 4 μm to 25 μm, more preferably 6 μm to 20 μm.

In the present invention, the reinforcement fiber (C) is preferably opened in the thermoplastic resin composition. Here, the opened state means a state in which the reinforcement fiber (C) in the thermoplastic resin composition is opened to a single fiber. Specifically, it means the state in which the number of reinforcing fibers in a bundle of 10 or more is 40% or less of the total number of reinforcing fibers when observed.

The reinforcement fiber (C) used in the present invention is preferably treated with a sizing agent or a surface treatment agent. Examples of the sizing agent or surface treatment agent include functional compounds such as epoxy compounds, isocyanate compounds, silane compounds, and titanate compounds. Epoxy compounds having a high epoxy content are particularly preferred from the viewpoint of improving the heat and moisture resistance of the reinforcing fibers.

The amount of the reinforcing fiber (C) used in the present invention is preferably 25 to 65 parts by weight based on 100 parts by weight of the total of the (A) polybutylene terephthalate and the (B) polycarbonate. When the amount of the reinforcing fiber (C) is 25 parts by weight or more based on 100 parts by weight of the total amount of polybutylene terephthalate (A) and polycarbonate (B), the mechanical properties of the molded article the hydrolysis resistance are improved. The amount thereof is preferably 25 parts by weight or more, and more preferably 30 parts by weight or more. When the amount of the reinforcing fiber (C) is 65 parts by weight or less with respect to 100 parts by weight in total of the polybutylene terephthalate (A) and the polycarbonate (B), the fluidity of the resin composition and the laser beam transmittance of the molded product are improved. The amount thereof is preferably 65 parts by weight or less, and more preferably 55 parts by weight or less.

The thermoplastic resin composition of the present invention contains an epoxy compound (D). As the epoxy compound (D), a compound having epoxy groups of 1000 or less of an epoxy equivalent, which represents the number of grams of the compound containing 1 gram equivalent of an epoxy group, can be preferably employed from the view point of hydrolysis resistance when it is used in insert molding. The epoxy compound may be generally used by blending with thermoplastic resins.

Preferred examples of the epoxy compound (D) used in the present invention include a compound having a glycidyl ester, a compound having a glycidyl ether, and a compound having both a glycidyl ester and a glycidyl ether in the molecule. These epoxy compounds are used alone or in combination of two or more. In particular, it is preferable to use a compound having a glycidyl ester and a compound having a glycidyl ether in combination, a compound having both a glycidyl ester and a glycidyl ether, or combination thereof. Specific epoxy compounds usable in the present invention include resorcinol glycidyl ether, sorbitol polyglycidyl ether, diethylene glycol diglycidyl ether, dibromophenyl glycidyl ether, dibromo neopentyl glycol diglycidyl ether, neopentyl glycol diglycidyl ether, 1,6-hexanediol diglycidyl ether. Ether, polyglycerin polyglycidyl ether, acrylic glycidyl ether, sorbitan polyglycidyl ether, p-tert-butylphenylglycidyl ether, phenylglycidyl ether, bisphenol-A-diglycidyl ether, bisphenol-S-diglycidyl ether, diglycidyl dimer acid esters, o-phthalic acid diglycidyl ester, hexahydrophthalic acid diglycidyl ester, neodecanoic acid glycidyl ester, terephthalic acid diglycidyl ester, soybean oil glycidyl ester, benzoic acid monoglycidyl ester, stearic acid monoglycidyl ester, lauric acid monoglycidyl ester, and p-hydroxybenzoic acid glycidyl ester ether. A particularly preferred epoxy compound, which has both glycidyl ester and glycidyl ether, is available from Petrochemicals Co., Ltd. under the trade name of CLEAR 828E10P, for example.

As the epoxy compound (D) used in the present invention, a dicyclopentadiene type novolac epoxy resin represented by the following general formula (1) is more preferably usable.

(1)

In the above general formula (1), n represents the number of repeating units of the dicyclopentadiene type novolac epoxy resin, and is preferably in a range of 0-10. The dicyclopentadiene type novolac epoxy resin usable in the present invention is in the form of brown pellets, and if the number of repeating units "n" is too small, the pellets will melt and cause blocking and results in difficulties to supply the pellets to a molding machine, which is undesirable situation. When the number of repeating units "n" is too large, the reaction between the novolac epoxy resins is likely to proceed and a crosslinked structure is easily formed, and the retention stability of the polybutylene terephthalate resin composition tends to be deteriorated. From the viewpoint of blocking property and retention stability, the number "n" of repeating units of the dicyclopentadiene type novolac epoxy resin is preferably 0 to 4, and more preferably 1 to 3. Particularly preferred dicyclopentadiene type novolac epoxy resins represented by the above general formula (1) are, for example, those sold under the names of HP-7200H by DIC Corporation and XD-1000L by Nippon Kayaku Co., Ltd.

The amount of epoxy compound (D) is preferably 0.2 to 0.8 parts by weight based on 100 parts by weight of the total of the polybutylene terephthalate (A) and the polycarbonate (B). In order to attain an excellent hydrolysis resistance, it is preferable to employ epoxy compound (D) in the amount of 0.2 parts by weight or more, but if it is added in excess amount such as more than 0.8 parts by weight, the mold deposit property tends to be deteriorated. From the viewpoint of moldability, 0.3 to 0.7 parts by weight is more preferable.

The thermoplastic resin composition of the present invention contains a carbodiimide compound (E). The carbodiimide compound (E) can bind to the carboxyl group terminal of the polyester resin, thereby suppressing hydrolysis and improving moisture and heat resistance. The carbodiimide compound (E) is a compound having at least one carbodiimide group represented by (—N=C=N—) in the molecule. For example, the carbodiimide compound (E) can be produced by heating an organic isocyanate to cause a decarboxylation reaction in the presence of a suitable catalyst.

Monocarbodiimide compound and/or polycarbodiimide compound can be used as the carbodiimide compound (E) in the present invention. Examples of monocarbodiimide compounds includes N,N'-diphenylcarbodiimide, N,N'-di-cyclohexylcarbodiimide, N,N'-di-2,6-dimethylphenylcarbodiimide, N,N'-diisopropylcarbodiimide, N,N'-dioctyldecylcarbodiimide, N,N'-di-o-toluylcarbodiimide, N,N'-di-p-toluylcarbodiimide, N,N'-di-p-nitrophenylcarbodiimide, N,N'-di-p-aminophenylcarbodiimide, N,N'-di-p-hydroxyphenylcarbodiimide, N,N'-di-p-chlorophenylcarbodiimide, N,N'-di-o-chlorophenylcarbodiimide, N,N'-di-3,4-dichlorophenylcarbodiimide, N,N'-di-2,5-dichlorophenylcarbodiimide, N,N'-p-phenylene-bis-o-toluylcarbodiimide, N,N'-p-phenylene-bis-dicyclohexylcarbodiimide, N,N'-p-phenylene-bis-di-p-chlorophenylcarbodiimide, N,N'-2,6,2'',6''-tetraisopropyldiphenylcarbodiimide, N,N''-hexamethylene-bis-cyclohexylcarbodiimide, N,N''-ethylene-bis-diphenylcarbodiimide, N,N'-ethylene-bis-dicyclohexylcarbodiimide, N-triyl-N'-cyclohexylcarbodiimide, N,N'-di-2,6-diisopropylphenylcarbodiimide, N,N'-di-2,6-di-tert-butylphenylcarbodiimide, N-toluyl-N'-phenylcarbodiimide, N,N''-benzylcarbodiimide, N-octadecyl-N''-phenylcarbodiimide, N-benzyl-N''-phenylcarbodiimide, N-octadecyl-N''-tolyl carbodiimide, N-cyclohexyl-N''-tolyl carbodiimide, N-phenyl-N''-tolyl carbodiimide, N-benzyl-N''-tolyl carbodiimide, N,N'-di-o-ethylphenylcarbodiimide, N,N'-di-p-ethylphenylcarbodiimide, N,N'-di-o-isopropylphenylcarbodiimide, N,N'-di-p-isopropylphenyl Carbodiimide, N,N'-di-o-isobutylphenylcarbodiimide, N,N'-di-p-isobutylphenylcarbodiimide, N,N'-di-2,6-diethylphenylcarbodiimide, N,N'-di-2-Ethyl-6-isopropylphenylcarbodiimide, N,N'''-di-2-isobutyl-6-isopropylphenylcarbodiimide, N,N'''-di-2,4,6-trimethylphenylcarbodiimide, N,N'''-di-2,4,6-triisopropylphenylcarbodiimide, and N,N'''-di-2,4,6-triisobutylphenylcarbodiimide. Examples of polycarbodiimide includes poly(1,6-hexamethylenecarbodiimide), poly(4,4'-methylenebiscyclohexylcarbodiimide), poly(1,3-cyclohexylenecarbodiimide), poly(1,4-cyclohexylenecarbodiimide), poly(4,4'-diphenylmethanecarbodiimide), poly(3,3'-dimethyl-4,4'-diphenylmethanecarbodiimide), poly(naphthylenecarbodiimide), poly(p-phenylenecarbodiimide), poly(m-phenylenecarbodiimide), poly(tolylcarbodiimide), poly(diisopropylcarbodiimide), poly(methyldiisopropylphenylenecarbodiimide), and poly(triethylphenylenecarbodiimide), poly(triisopropylphenylenecarbodiimide). These compounds may be used alone or in combination. Among these, polycarbodiimide compounds are preferable, and poly(diisopropylphenylcarbodiimide) is more preferable. Poly(diisopropylphenylcarbodiimide) is available, for example, from Rhein Chemie, Inc. under the tradename "STABAXOL" P (registered trademark).

In the present invention, the amount of the carbodiimide compound (E) is 0.2 to 0.8 parts by weight based on 100 parts by weight of the total amount of the polybutylene terephthalate (A) and the polycarbonate (B). It is preferable to add 0.2 parts by weight or more for a high degree of hydrolysis resistance. However, if the carbodiimide compound (E) is added more than 0.8 parts by weight, the mold deposit property tends to be deteriorated. From the viewpoint of moldability, 0.3 to 0.7 parts by weight is more preferable.

The thermoplastic resin composition of the present invention contains a phosphorus stabilizer (F). The phosphorus-based stabilizer (F) suppresses the transesterification reaction of polybutylene terephthalate (A) and polycarbonate (B) and improves the retention stability.

Examples of phosphorus-based stabilizers (F) include phosphite-based stabilizers (phosphite compounds) and phosphate-based stabilizers (phosphate compounds). Such stabilizers may be used alone or in combination. Among them, the phosphate-based stabilizer is preferable because it is more effective to improve the retention stability of the thermoplastic resin composition.

Examples of the phosphite-based stabilizers include tetrakis[2-t-butyl-4-thio(2'-methyl-4'-hydroxy-5'-t-butylphenyl)-5-methylphenyl]-1,6-hexamethylene-bis(N-hydroxyethyl)-N-methylsemicarbazide)-diphosphite, tetrakis[2-t-butyl-4-thio(2'-methyl-4'-hydroxy-5'-t-butylphenyl)-5-methylphenyl]-1,10-decamethylene-di-carboxylic acid-di-hydroxyethylcarbonylhydrazide-diphosphite, tetrakis[2-t-butyl-4-thio(2'-methyl-4'-hydroxy-5'-t-butylphenyl)-5-methylphenyl]-1,10-decamethylene-di-carboxylic acid-di-salicyloyl hydrazide-diphosphite, tetrakis[2-t-butyl-4-thio(2'-methyl-4'-hydroxy-5'-t-butylphenyl)-5-methylphenyl]-di(hydroxyethylcarbonyl)hydrazide-diphosphite, and tetrakis[2-t-butyl-4-thio(2'-methyl-4'-hydroxy-5'-t-butylpheny)-5-methylphenyl]-N,N'-bis(hydroxyethypoxamide-diphosphite.

Phosphite stabilizers in which at least one P—O bond is bonded to an aromatic group are preferred. Examples of such compounds include tris(2,4-di-t-butylphenyl) phosphite, tetrakis(2,4-di-t-butylphenyl) 4,4'-biphenylene phosphonite, bis(2,4-di-t-butyl)phenyl) pentaerythritol-di-phosphite, bis(2,6-di-t-butyl-4-methylphenyl) pentaerythritol-di-phosphite, 2,2-methylenebis(4,6-di-t-butyl)phenyl)octyl phosphite, 4,4'-butylidene-bis(3-methyl-6-t-butylphenyl-di-tridecyl)phosphite, 1,1,3-tris(2-methyl-4-ditridecylphosphine phyto-5-t-butyl-phenyl)butane, tris (mixed mono and di-nonylphenyl) phosphite, tris (nonylphenyl) phosphite, and 4,4'-isopropylidene bis(phenyl-dialkylphosphite). One or two or more kinds of such compounds may be used in combination. Among them, tris(2,4-di-t-butylphenyl)phosphite, 2,2-methylenebis(4,6-di-t-butylphenyl)octylphosphite, bis(2,6-di-t-butyl)-4-methylphenyl)pentaerythritol-di-phosphite, tetrakis(2,4-di-t-butylphenyl)-4,4'-biphenylene phosphonite and the like can be preferably used. Among these, cyclic neopentanetetraylbis(2,6-di-t-butyl-4-methylphenyl)phosphite is particularly preferable, and for example, "ADEKA STAB" (registered trademark) PEP-36 manufactured by ADEKA is available in the market.

Examples of the phosphate stabilizers include monostearyl acid phosphate, distearyl acid phosphate, methyl acid phosphate, isopropyl acid phosphate, butyl acid phosphate, octyl acid phosphate, isodecyl acid phosphate, and the like. Two or more types of these may be used in combination. Among them, monostearyl acid phosphate and distearyl acid phosphate are preferable. Particularly, equimolar mixtures of these mono- and di-stearyl acid phosphates are particularly preferred, and such mixtures are available, for example, under the tradename "ADEKA STAB" AX-71 from ADEKA.

The amount of the phosphorus-based stabilizer (F) is preferably 0.01 to 0.2 parts by weight based on 100 parts by weight of the total of (A) polybutylene terephthalate and (B) polycarbonate. When the amount of the phosphorus-based stabilizer (F) is 0.01 part by weight or more, the retention stability of the thermoplastic resin composition is enhanced. On the other hand, when the amount of the phosphorus-based stabilizer (F) is 0.2 parts by weight or less, the mold deposit property is excellent, and the moist and heat resistance is sufficiently improved. The amount of the phosphorus-based stabilizer (F) is more preferably 0.03 to 0.08 parts by weight.

The other resin component that may be added to the resin composition of the present invention as far as such resin components can be melt-molded. For example, AS resin (acrylonitrile/styrene copolymer), hydrogenated or unhydrogenated SBS resin (styrene/butadiene/styrene triblock copolymer), hydrogenated or unhydrogenated SIS resin (styrene/isoprene/styrene triblock copolymer), polyethylene resin, polypropylene resin, polymethylpentene resin, cyclic olefin resin, cellulose resin such as cellulose acetate, polyamide resin, polyacetal resin, polysulfone resin, polyphenylene sulfide resin, polyether ether ketone resin, polyimide resin, polyether imide resin, and the like, can be added. Such resin components can be employed alone or in combination.

As the inorganic filler, any of plate-shaped, powdery, and granular fillers can be used. For example, fibrous or whisker-like fillers such as rock wool, potassium titanate whiskers, barium titanate whiskers, aluminum borate whiskers, and silicon nitride whiskers, and powder, granular or plate-shaped filler such as mica, talc, kaolin, silica, calcium carbonate, glass beads, glass flakes, glass microballoons, clay, molybdenum disulfide, wollastonite, montmorillonite, titanium oxide, zinc oxide, calcium polyphosphate, graphite, and barium sulfate, can be used alone or in combination of two or more kinds in the present invention.

As a release agent, any kind of release agents usable for the release agent for molding the polyester resin composition can be used in the present invention. Examples of release agent include plant wax such as carnauba wax and rice wax, animal wax such as beeswax and lanolin, mineral wax such as montan wax, petroleum wax such as paraffin wax and polyethylene wax, and oil-based waxes such as castor oil and its derivatives, fatty acids and its derivatives. One or two or more kinds of release agents may be used in combination.

As a stabilizer, any kind of stabilizers usable for the stabilizer of the polyester resin composition can be used in the present invention. For example, an antioxidant, a light stabilizer, a catalyst deactivator, etc. can be used alone or in combination of two or more kinds.

Examples of the colorant include organic dyes, organic pigments, and inorganic pigments. Such colorant may be usable alone or in combination of two or more kinds thereof.

In the polybutylene terephthalate resin composition of the present invention, it is preferred that the components (A) to (F) and, if necessary, other components are evenly or uniformly mixed or dispersed therein. As a method for producing the polybutylene terephthalate resin composition of the present invention, for example, each component is melt-kneaded using a melt-kneader such as a single-screw or twin-screw extruder, a Banbury mixer, a kneader or a mixing roll. The components may be mixed together in advance and then melt-kneaded. In addition, it is preferable that the water content of each component is small, and it is desirable to dry it beforehand if necessary.

As a method of charging each component into the melt-kneader, for example, a single-screw or twin-screw extruder can be used. For example, (A) polybutylene terephthalate resin, (B) polycarbonate resin, (D) epoxy compound, (E) carbodiimide compound, (F) phosphorus-based stabilizer, and other components as necessary, are supplied from a main charging port located at upstream of the screw of the extruder, and (C) reinforcing fiber is supplied from a sub-charging port provided between the main charging port and the tip (outlet) of the extruder, so that these components are melt-mixed together and then mixed with the reinforcing fiber (C) so as to obtain the resin composition of the present invention.

The melt-kneading temperature is preferably 110° C. or higher, more preferably 210° C. or higher, and even more preferably 240° C. or higher in terms of excellent fluidity and mechanical properties. Further, the temperature is preferably 360° C. or lower, more preferably 320° C. or lower, and still more preferably 280° C. or lower. Here, the melt-kneading temperature refers to a set temperature of the melt-kneading machine, for example, in the case of using a twin-screw extruder, refers to a cylinder temperature.

The polybutylene terephthalate resin composition of the present invention can be processed or formed into various molded parts through any methods such as injection molding, extrusion molding, blow molding, press molding and fiber spinning. For example, the temperature during injection molding is preferably 240° C. or higher in view of further improving fluidity, and preferably 280° C. or lower in view of improving mechanical properties.

Examples of molded parts include injection molded parts, extrusion molded parts, blow molded parts, films, sheets, and fibers. Since the polybutylene terephthalate resin composition of the present invention has excellent retention stability, it is also preferably usable for large-sized molded parts.

In the present invention, the above various molded products can be used for various applications such as automobile members, electric/electronic members, building members, various containers, daily necessities, household goods and sanitary goods. In particular, the polybutylene terephthalate resin composition of the present invention is suitable as insert parts for various sensor parts and terminal blocks or bases of automobiles, since such molded products has an excellent resistance to thermal shocks at from a low temperature to a high temperature, for example.

The laser welding in the present invention is, for example, a method, where a molded product made of a laser light transmitting material (laser light transmitting side) and a molded product made of a laser light absorbing material (laser light absorbing side) are overlapped with each other, and a laser light is irradiated through the laser light transmitting material to heat the interface with the molded product capable of absorbing laser light so that the molded product made of the laser light transmitting material and the molded product made of the laser light absorbing material are welded together. The thermoplastic resin composition of the present invention is used on the laser beam transmitting side. That is, in the laser welding, a laser light absorption side molded product is separately prepared, and the molded product formed of the present thermoplastic resin composition and the laser light absorption side molded product are brought into contact with each other at the surfaces to be welded, to which a laser beam is applied from the laser light transmitting material side (i.e., the molded product formed of the present thermoplastic resin composition). As described above, a laser light is irradiated from the side of the molded product of the laser light transmitting material (the present invention) and a laser welding is performed. As the resin composition for the laser light absorbing material, for example, a thermoplastic resin composition containing a black pigment/dye such as carbon black can be preferably used.

In the present invention, examples of laser light usable for laser welding include laser light in the near infrared region. As the laser light in the near infrared region, a laser that emits light having a wavelength of 900 to 1200 nm is particularly preferable. A semiconductor laser and a YAG laser (Yttrium Aluminum Garnet laser) are preferably employable.

Figure 3:
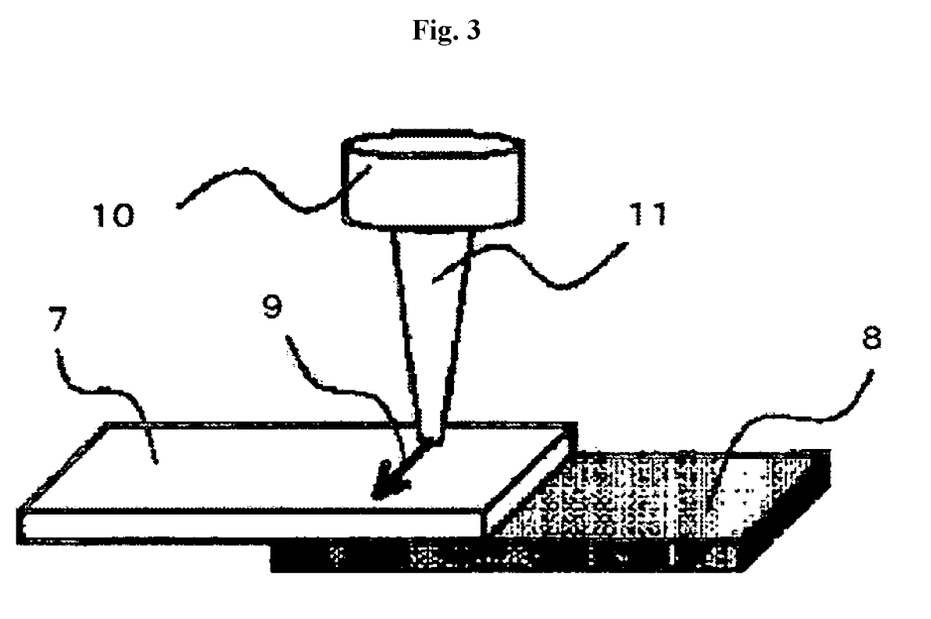
FIG. 3 is a schematic drawing showing the method of laser welding.

For example, FIG. 3 is a schematic drawing showing the method of laser welding. In the laser welding method, as shown in FIG. 3, a laser welding specimen 7 made of a material capable of transmitting a laser beam (e.g., the thermoplastic resin composition of the present invention) is placed above, and a laser welding specimen 8 made of a material capable of absorbing a laser beam was placed below but overlapping with the specimen 7. A laser beam 11 is irradiated from above. The laser irradiation is performed by a laser beam radiation device 10 along a laser welding track 9.

The laser irradiation conditions for laser welding are not particularly limited, and may be appropriately adjusted depending on the combination of materials used and the shape of the molded product. This irradiation condition can be chosen so that the energy is sufficient to melt the interface between the laser light transmitting side molded article and the laser light absorbing side molded article. For example, the appropriate conditions and ranges thereof may be chosen depending on the laser light transmittance and thickness of the laser light transmitting side molded product, and a person skilled in the art will be able to find appropriate conditions for the laser welding by considering or adjusting the output of the laser light, the specifications of the apparatus for laser welding, and the irradiation time (scan speed), and the like. In order to prevent problems such as unexpected melting and foaming/bubbling in areas other than the intended welded part or area due to foreign matter contained in the molded product on the laser light transmission side, it is preferable to set the output energy lower and/or the irradiation time shorter, rather than too high or too long, as far as the welding can be properly performed.

EXAMPLES

Hereinafter, the present invention will be described in more detail with reference to the Examples. However, these Examples should not be construed to limit scope of the present invention. The abbreviations and contents of the raw materials, etc. used in the Examples and the Comparative Examples are shown below.

(A) Polybutylene Terephthalate Resin

A: Polybutylene terephthalate (MFR: 50 g/10 minutes (250° C., 1000 g), "Toraycon" (registered trademark) 1050M (trade name) manufactured by Toray Industries, Inc.)

(B) Polycarbonate Resin

B: Polycarbonate (Mitsubishi Engineering Plastics Co., Ltd. "Upilon" (registered trademark) H3000 (trade name))

(C) Reinforcing Fiber

C: Chopped strand of glass fiber (Nippon Electric Glass Co., Ltd. T-120 (trade name) 3 mm long, average fiber diameter 13 μm)

(D) Epoxy Compound

D: Dicyclopentadiene type novolac epoxy resin having an epoxy equivalent of 290 g/eq represented by the general formula (1), as described above, "HP-7200H" manufactured by DIC Co., Ltd. was used. In the general formula (1), n is a value of from 1 to 3.

(E) Carbodiimide Compound

E: Carbodiimide compound (poly(diisopropylphenylcarbodiimide)) ("Stavaxol" (registered trademark) P (trade name) manufactured by Rain Chemie)

(F) Phosphorus Stabilizer

F-1: Phosphate Antioxidant (substantially equimolar mixture of mono- and di-stearyl acid phosphates) (ADEKA Tab "Adeka Stab" (registered trademark) AX-71 (trade name)).

F-2; Phosphite antioxidant (cyclic neopentanetetraylbis(2, 6-di-t-butyl-4-methylphenyl)phosphite) (ADEKA STAB "PEP-36" (trade name) produced by ADEKA).

(1) Tensile Strength

The tensile strength was measured according to ISO527-1 and ISO527-1-2 by using test pieces (e.g., molded articles). When the tensile strength of the test piece is 100 MPa or more, the mechanical properties were judged as good. 130 MPa or more is a more preferable tensile strength.

(2) Hydrolysis Resistance

After preparing test pieces similar to the test pieces used for the above tensile strength test (1), and the test pieces were subjected to a moisture-heat treatment at a temperature of 80° C. and a humidity of 85% RH for 1500 hours, and then the tensile strength of each test piece was measured in the same method as explained above (1). When the retention of tensile strength after the moisture-heat treatment was 75% or more, it can be judged as a good hydrolysis resistance. 85% or more of the tensile strength retention rate is more preferable. Here, the tensile strength retention rate is calculated based on the below formula.

Tensile strength retention rate (%)=tensile property (after the moisture-heat treatment)(MPa)×100/ tensile property(before the moisture-heat treatment) (MPa)

(3) Laser Beam Transmittance

Figure 1A:
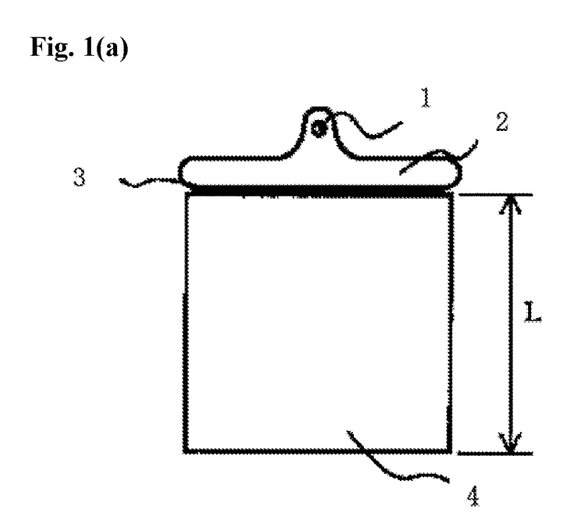
FIG. 1(a) is a plan view of a specimen (test piece) used for evaluating a laser beam transmittance in the Examples.
Figure 1B:
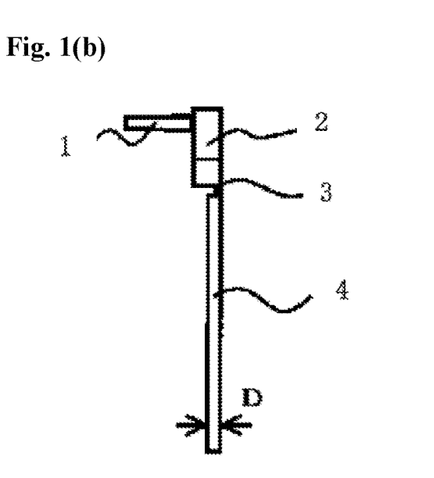
FIG. 1(b) is a side view of the specimen of FIG. 1(a).

For evaluating the laser beam transmittance, as the laser beam transmittance evaluation test piece, test pieces each having a square shape (L 60 mm×L60 mm) and thickness D of 2 mm, as shown in FIGS. 1(a)-1(b) were used. The test pieces are molded at the molding conditions of a cylinder temperature of 260° C. and a mold temperature of 80° C. FIG. 1(a) is a plan view of the test piece 4 for evaluating laser beam transparency, and FIG. 1(b) is a side view thereof. The laser beam transmittance evaluation test piece was formed to have a sprue 1, a runner 2 and a gate 3. The test piece was cut at the gate 3 and used as a laser beam transmittance evaluation test piece. An ultraviolet near infrared spectrophotometer (UV-3100) manufactured by Shimadzu Corporation was used as a tester, and an integrating sphere was used as a detector. The transmittance represents the ratio (%) of the amount of transmitted light (light going through the test piece) to the amount of incident light (light irradiated to the test piece). In the table below, the light transmittance of the near infrared ray of 940 nm wavelength is referred to as "laser transmittance". If it is 20% or more, the laser transmittance is good, and 25% or more is more preferable.

(4) Mold Deposit

Figure 2A:
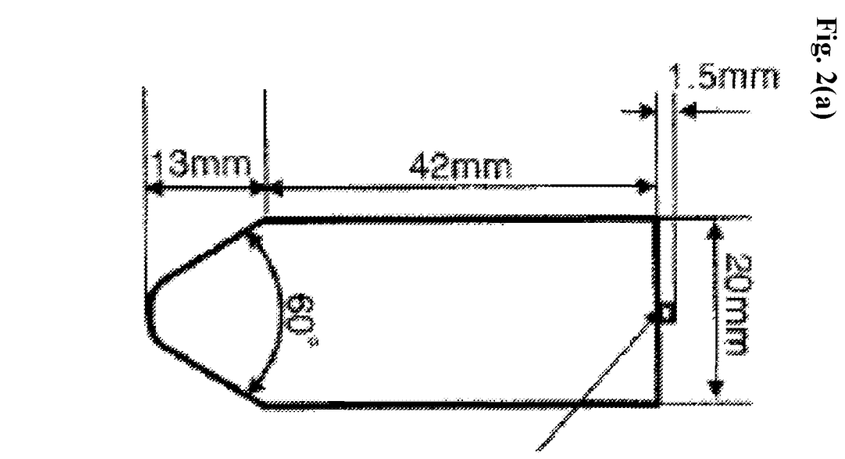
FIG. 2(a) is a front view of a specimen (test piece) for a mold deposit evaluation.
Figure 2B:
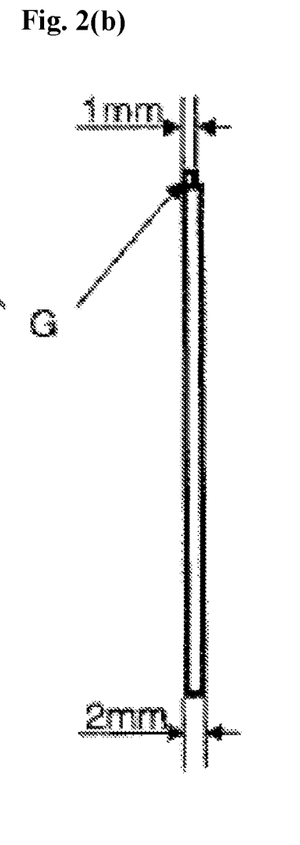
FIG. 2(b) is a side view of the specimen for the mold deposit evaluation.

Using a Nissei injection molding machine "PS40" having a maximum mold clamping force of 40 tons, 1000 of the mold deposit evaluation test pieces, as shown in FIGS. 2(a)-2(b), are consecutively injection molded (test piece size: length 55 mm; width 20 mm; thickness 2 mm, gate size: width 2 mm; thickness 1 mm (side gate), gas vent portion: maximum length 20 mm; width 10 mm; depth 5 μm) with the same mold. FIG. 2(a) shows a front view of the molded product for the mold deposit evaluation, and FIG. 2(b) shows a side view of the molded product for the mold deposit evaluation. The symbol G indicates a gate. The state of adhesion of the mold deposit in the mold cavity after 1000 shots of consecutively molding was visually observed. In the table blow, A represents that no deposit was adhered to the mold cavity (the most preferable result), B represents that no substantial deposit was adhered to the mold cavity (preferable result), and C represents that deposit was adhered to the mold cavity in this mold deposit test (undesired result).

Examples 1 to 9

The components (A), (B), (D), (E), (F), and all other additives, as shown in Table 1, were supplied into the twin-screw extruder from a main feeder at upstream of the extruder, and the component (C) is fed to the extruder from a side feeder between the main feeder and an end tip of the extruder. These components are melted and kneaded with the twin-screw extruder having a screw diameter φ of 57 mm at a cylinder temperature of 250° C.

The resin composition was discharged as the strand from the die, and cooled in a cooling bath and then pelletized by a strand cutter. The obtained pellets were dried with a hot air dryer at 130° C. for 3 hours or more, and then test pieces were prepared from the pellets, and the tensile strength, the hydrolysis resistance, the laser beam transmittance, and the mold deposit were evaluated by the evaluation methods as explained above. The obtained test pieces were all excellent in the tensile strength, the resistance to moist-heat test, and the laser beam transmittance, as shown in Table 1. Further, the obtained polybutylene terephthalate resin compositions were excellent in a mold deposit test.

TABLE 1

| | | Examples | | | | | | | | |
|---|---|---|---|---|---|---|---|---|---|---|
| | | 1 | 2 | 3 | 4 | 5 | 6 | 7 | 8 | 9 |
| (A) Polybutylene terephthalate | Wt. Parts | 65 | 70 | 60 | 65 | 65 | 65 | 65 | 65 | 65 |
| (B) Polycarbonate | | 35 | 30 | 40 | 35 | 35 | 35 | 35 | 35 | 35 |
| (C) T120 | | 42 | 42 | 42 | 30 | 60 | 42 | 42 | 42 | 42 |
| (D) HP7200 | | 0.56 | 0.56 | 0.56 | 0.56 | 0.56 | 0.56 | 0.56 | 0.28 | 0.56 |
| (E) Carbodiimide compound | | 0.28 | 0.28 | 0.28 | 0.28 | 0.28 | 0.28 | 0.28 | 0.7 | 0.28 |
| (F-1) Phosphate compound | | 0.06 | 0.06 | 0.06 | 0.06 | 0.06 | 0.04 | 0.18 | 0.06 | |
| (F-2) Phosphate compound | | | | | | | | | | 0.06 |
| Moisture and heat resistance | | | | | | | | | | |
| Before test | MPa | 142 | 144 | 143 | 112 | 165 | 142 | 143 | 142 | 142 |
| 85° C. × 85% RH × 1500 h | MPa | 127 | 133 | 111 | 95 | 153 | 130 | 114 | 129 | 119 |
| Tensile strength retention rate | % | 89 | 92 | 78 | 85 | 93 | 92 | 80 | 91 | 84 |
| Laser transmittance | % | 25 | 22 | 30 | 30 | 20 | 25 | 25 | 25 | 25 |
| Mold deposit | | A | A | A | A | A | A | A | B | B |

Comparative Examples 1 to 8

Test pieces were obtained from the components (A), (B), (D), (E), (F), and all other additives, as shown in Table 2, in the same method as in the Examples as explained above. Specifically, the components (A), (B), (D), (E), (F), and all other additives, as shown in Table 2, were supplied into the twin-screw extruder from a main feeder at upstream of the extruder, and the component (C) is fed to the extruder from a side feeder between the main feeder and an end tip of the extruder. These components were melted and kneaded with the twin-screw extruder having a screw diameter φ of 57 mm at a cylinder temperature of 250° C. The obtained pellets were dried with a hot air dryer at 130° C. for 3 hours or more, and then test pieces were prepared from the pellets, and the tensile strength, the hydrolysis resistance, the laser beam transmittance, and the mold deposit were evaluated by the above evaluation methods, as the same manner as in the Examples.

The obtained test pieces were inferior in the tensile strength, the hydrolysis resistance and the laser light transmittance. The obtained polybutylene terephthalate resin compositions were also inferior in the mold deposit test, as shown in Table 2.

TABLE 2

|  |  | Comparative Examples | | | | | | | |
|---|---|---|---|---|---|---|---|---|---|
|  |  | 1 | 2 | 3 | 4 | 5 | 6 | 7 | 8 |
| (A) Polybutylene Terephthalate | Wt. Parts | 30 | 65 | 65 | 65 | 65 | 65 | 65 | 65 |
| (B) Polycarbonate |  | 70 | 35 | 35 | 35 | 35 | 35 | 35 | 35 |
| (C) T120 |  | 42 | 42 | 42 | 42 | 42 | 42 | 42 | 70 |
| (D) HP7200 |  | 0.56 | 0.56 | 0.56 |  | 1.00 | 0.56 | 0.56 | 0.56 |
| (E) Carbodiimide Compound |  | 0.28 | 0.28 | 0.28 | 0.28 | 0.28 |  | 1.00 | 0.28 |
| (F-1) Phosphate compound |  | 0.06 |  | 0.4 | 0.06 | 0.06 | 0.06 | 0.06 | 0.06 |
| (F-2) Phosphate compound |  |  |  |  |  |  |  |  |  |
| Moisture and heat resistance |  |  |  |  |  |  |  |  |  |
| Before test | MPa | 142 | 144 | 143 | 142 | 143 | 143 | 143 | 171 |
| 85° C. × 85% RH × 1500 h | MPa | 99 | 98 | 105 | 88 | 133 | 89 | 134 | 161 |
| Tensile strength retention rate | % | 70 | 68 | 73 | 62 | 93 | 62 | 94 | 94 |
| Laser transmittance | % | 33 | 25 | 25 | 25 | 25 | 25 | 25 | 17 |
| Mold deposit |  | A | C | C | A | C | A | C | B |

The invention claimed is:

1. A thermoplastic resin composition suitable for laser welding comprising:
   55 to 75 parts by weight of a polybutylene terephthalate (A) and 25 to 45 parts by weight of a polycarbonate (B) in total amount of 100 parts by weight;
   25 to 65 parts by weight of a reinforcing fiber (C) based on 100 parts by weight of the polybutylene terephthalate (A) and the polycarbonate (B);
   0.2 to 0.8 parts by weight of an epoxy compound (D) based on 100 parts by weight of the polybutylene terephthalate (A) and the polycarbonate (B);
   0.2 to 0.8 parts by weight of a carbodiimide compound (E) based on 100 parts by weight of the polybutylene terephthalate (A) and the polycarbonate (B); and
   a phosphorus-based stabilizer (F).

2. The thermoplastic resin composition according to claim 1, wherein the phosphorus-based stabilizer (F) comprises a phosphate compound.

3. The thermoplastic resin composition according to claim 1, wherein an amount of the phosphorus-based stabilizer (F) is 0.01 to 00.8 parts by weight based on 100 parts by weight of the polybutylene terephthalate (A) and the polycarbonate (B).

4. The thermoplastic resin composition according to claim 1, wherein the epoxy compound (D) is a dicyclopentadiene novolac epoxy resin represented by the following general formula (1):

where n is in a range of 0 to 10.

5. A molded article suitable for laser welding comprising the thermoplastic resin composition of claim 1.

6. A composite molded product obtained by laser welding the molded article according to claim 5.

7. A method for obtaining a composite molded product comprising:
provingproviding a molded article comprising the thermoplastic resin composition of claim 1 and another molded article comprising a thermoplastic resin;
bringing the molded article and said another molded article into contact each other; and
irradiating a laser beam on the molded article to allow the laser beam to pass through the molded article and to be absorbed to said another molded article, whereby melting and fusing the molded article and said another molded article so as to connect the molded article and said another molded article each other at a portion where the molded article and said another molded article are contacted.

* * * * *